United States Patent Office

2,915,438
Patented Dec. 1, 1959

2,915,438

PREPARATION OF BRUCELLA ANTIGEN

Victor Richard Berliner and William Bert Gilardi, Somerville, N.J., assignors to Ortho Pharmaceutical Corporation, a corporation of New Jersey No Drawing. Application August 31, 1956
Serial No. 607,288

1 Claim. (Cl. 167—78)

This invention relates to the control of brucellosis and more particularly to a vaccine rich in antigens effective in providing immunity against brucellosis and to the method of preparing the same.

Brucellosis is an infective disease of cattle, swine, and goats and is caused by bacteria of the Brucella group. This manifests its presence in animals by inducing premature abortion of the fetus, thereby causing economic losses to the live-stock breeder not only through the loss of the offspring but in the case of dairy cows also through a greatly reduced production of milk.

Brucellosis constitutes a serious hazard to the human population because the infective organisms can be passed on to man by contact with the meat of infected animals or through consumption of infected milk. The disease in man is also called brucellosis although the older nomenclature "undulant fever," derived from the typical symptoms of undulating attacks of fever, is still in use. Brucellosis in man and cattle is also referred to as "Bang's Disease" after Bang, who in 1897 discovered the connection between the causative bacillus and abortion in cattle.

Different types of Brucella bacillus have been classified according to their principal hosts. *Brucella abortus* is the organism causing principally the disease in cattle; *Brucella suis*, or *Porcine brucella* is the type responsible for the disease in swine; and *Brucella melitensis* is the microorganism harbored by goats.

Cross infections between these species do occur, however, and all three are pathogenic. Pathogenicity in man varies. *Brucella melitensis* is the most dangerous, the disease terminating frequently in death. The term, "Malta Fever," originally given by Bruce to a disease that seemed to be specific to the island of Malta, is now reserved for the type of disease caused specifically by *Brucella melitensis*. *Brucella abortus*, the bovine type, is considered the least pathogenic, rarely terminating fatally, but it is believed that unrecognized infections with *Brucella abortus* are responsible for many debilitating conditions in man predisposing to other more serious diseases, such as rheumatic fever, endocarditis and others. Public Health Departments in many States consider the consumption of Brucella infected milk as such a danger to general health that in many States starting with 1958, only those herds will be allowed to sell milk that are free from Brucella infected cattle.

It is an object of our invention to provide a vaccine rich in antigens that will create a state of immunity against Brucella bacteria.

It is a further object of our invention to provide a vaccine that is free of living bacteria. Still another object of our invention is to provide a vaccine against brucellosis that will not interfere with the agglutination test presently used in the testing of herds.

At the present time, there are two well-known methods for combating brucellosis in cattle. One program is directed towards its eradication by eliminating infected animals that are detected by the regular testing procedures. Animals which give a positive agglutination test are classified as reactors and these animals are slaughtered. Although herds and even entire areas become occasionally freed of reactors, this state can never become permanent as any animal can pick up brucellosis organisms from infected water, from the soil, by contact with infected litter in trucks, by carrier birds and stray dogs. It is a further drawback of the rigid elimination process that the remaining animals may not develop a natural immunity. Thus when such a herd gets exposed to infection, a severe outbreak of the disease with abortions in as high as 70 percent of the animals may occur.

The second method of attempting to control brucellosis is by a system of protective vaccination of calves. This program is based on the knowledge that the sexually immature calf has a natural defense mechanism against brucellosis preventing permanent infection. By vaccinating calves at the age of 4 to 8 months, a protection against infection later in life is conferred on these animals because their immunity mechanism is stimulated by the living organisms; at breeding age the infective bacteria themselves are no longer present. A special strain of *Brucella abortus* developed by the United States Department of Agriculture and identified as Strain 19 is used in the calf vaccination program. Strain 19 is claimed to have low virulence, but to be antigenic. The closer to onset of sexual maturity vaccination is performed, the greater is the chance that the calf will not be able to throw off the living bacteria, and instead will become a permanently infected carrier. The calf vaccinated just prior to sexual maturity may also retain a high antibody titer, that is confusing to the present official test program.

Originally, a retained titer of 1:50 in a calfhood vaccinated cow of breeding age was attributed to antibodies in her system created by the vaccination, and such an animal was considered as non-infected; but in a calfhood vaccinated cow, a titer of 1:100 was regarded as an indication of an infection. As the vaccination program went on, the occurrence in vaccinates of a titer of 1:100 was so frequent that since 1956, this titer in vaccinated cows is considered to be indicative of a high degree of immunity, and not of infection. The correctness of this assumption is still disputed by many workers, especially in view of the fact that a low titer of 1:100 is often found in non-vaccinated cows that abort due to a contracted infection.

A further disadvantage of the calfhood vaccination program is that the immunity conferred to the calf by vaccination does not last throughout its productive life. After three or four pregnancies, the rate of infection even in vaccinated animals is quite high, sometimes reaching 20 to 40 percent in a herd.

Revaccination with Strain 19 vaccine of adult cows that have lost their immunity does cut down the incidence of abortion in an infected herd, but the vaccinated animals become carriers and remain infected even though they do not abort. Such cows shed Brucella organisms in their milk and, therefore, are a serious health hazard.

There is also some evidence that the low virulence and pathogenicity of Strain 19 to cattle reverts to a virulent form in man. Furthermore, any program of vaccination with living organisms contributes to a continuous dissipation of living Brucella organisms.

In spite of all these disadvantages, vaccination of calves with Strain 19, is, at the present time, the only officially recognized and permitted procedure in most countries.

It has been realized for some time that maintenance of the natural defense mechanism would be the ideal method of controlling brucellosis. This defense system is the immunogenic system of the body. How it operates is not known in detail, but it is known that exposure to an infection does create a state of immunity. The created immunity can work in two ways: It can protect against invasion by the organisms and their permanent establishment in the body (anti-infective effect), secondly it can protect the body against the direct damage caused by already established bacteria (anti-toxic effect). In the case of brucellosis, the latter would become obvious by protection against pathological abortion and the former by protecting the animal from becoming a reactor-carrier.

Attempts to develop a known living vaccine go back to the time when Bang made his original discovery. The use of bacterins made from killed bacteria is by no means new, and in many diseases they are effective, even though they do not provide a long lasting protection. In bovine brucellosis, vaccination with killed bacteria has not been successful. In the light of present knowledge, it seems possible that in the early attempts the bacteria were treated too harshly. When bacteria were killed by heat or by certain chemicals, the anti-genically active systems in the bacteria were altered to such an extent that the specific antigens involved in producing protection against brucellosis were destroyed. The usual killing procedure was boiling or even autoclaving, or suspension in phenol in concentrations above 0.5 percent or in formalin of 0.25 percent or higher. Usually the first bacterial suspension is centrifuged, the supernant liquid discarded and the resuspended bacteria used for the preparation of bacterins. Brucellosis bacteria have also been killed by irradiation with ultraviolet light, with ether, and by sonic disintegration.

We have now discovered a process for isolating antigenic material from the Brucella organism with which the immunizing anti-infective and anti-toxic systems can be sensitized.

We have found that the Brucella organism produces antigens which are soluble in an aqueous medium. Such antigens are released into aqueous media during the growth phase of Brucella bacteria, and they may be separated from the live bacteria by filtration through a sterilizing filter.

Our vaccine may be administered at yearly intervals, and the vaccinated animal may be readily distinguished from an infected animal since the agglutination test on a vaccinated animal differs markedly in a manner to be described below.

*Example I*

A nutrient broth suitable for the growth of Brucella bacteria is prepared by dissolving in distilled water the following nutrients which may be purchased as a dry mixture from Albimi Laboratories of Brooklyn, New York:

| | Parts |
|---|---|
| Peptone "M" | 20.0 |
| Dextrose CP | 1.0 |
| Yeast autolysate | 2.0 |
| Sodium chloride | 5.0 |
| Sodium bisulfite | 0.1 |

Sufficient distilled water is added to bring the total weight up to 1000 parts. Sterilization is effected by heating the broth for 20 minutes at 15 pounds per square inch pressure (121° C.).

The broth is inoculated with the smooth (S–) form of living *Brucella abortus,* and is aerated during the growth phase. A convenient method of growing the bacteria in the laboratory is to partially fill 250 cc. bottles with the broth, sterilize, inoculate, and then agitate the bottles on a mechanical shaker for 48 hours at 37° C. For the commercial production, a sealed water-heated kettle fitted with an agitator and having a sterile air inlet may be employed.

At the end of 48 hours, the nutrient medium containing live bacteria is divided into four parts of approximately equal volume. To the first portion (vaccine I) is added 1 percent by weight sodium carbonate and the sample is stored for 48 hours under refrigeration prior to centrifuging. The broth is then filtered through a Seitz filter to remove all living bacteria. The Seitz filter is assembled with a sterilizing filter element having a pore size of about 0.1 micron.

The second sample (vaccine II) is treated in a manner similar to the first, but is pasteurized after filtration for one-half hour at a temperature of 60–66° C.

The third portion (vaccine III) is not treated with sodium carbonate. The nutrient broth is stored under refrigeration for 48 hours, centrifuged and filtered through a sterilizing filter.

The fourth portion (vaccine IV) is also centrifuged and filtered after refrigeration. No sodium carbonate is added. The fourth portion, however, is pasteurized after filtration for one-half hour at 60–66° C.

The four vaccines prepared as described above are injected subcutaneously into cattle. In each instance, the cow develops a titer within two weeks which returns to normal in approximately a month. There is no indication at any time that the water soluble nutrients present in the broth cause any undesirable side effects or reactions. The four aliquot samples, prepared as described above, appear to be equally effective when tested in individual cows. The pasteurization step is an additional safety feature that is not actually required. The above tests, however, indicate that pasteurization does not destroy the antigen.

*Test of vaccine I*

A three year old cow, not pregnant at time of vaccination, was vaccinated by subcutaneous administration of 10 cc. of vaccine I prepared according to Example I. One week later, her serum titer had risen from negative to a titer of 1:50, but after nine weeks her serum did not give rise to an agglutination even at a ratio of 1:25, showing that the induced titer was not permanent.

*Test of vaccine II*

A four year old cow, in the eighth month of gestation, was vaccinated subcutaneously on April 16, with 10 cc. of vaccine II prepared according to Example I. The titer increased to 1:100 within a week. On May 7, less than one month later, the titer had returned to 1:25. The cow was challenged on May 14, by being injected intramuscularly with 2 cc. of a fresh Brucella suspension ($10^9$ bacteria per cc.). The cow calved that same day, May 14, on time. On May 28, the titer had dropped to 1:200 and on June 15, to 1:100. Cultures made from the uterus at time of calving were negative.

*Test of vaccine III*

A four year old cow in her second month of gestation, was vaccinated with a subcutaneously administered dose of 10 cc. of vaccine III prepared according to Example I. Within one week her titer rose to 1:100, but after two weeks it dropped to 1:50. In seven weeks it gradually dropped to a negative level of 1:25.

*Test of vaccine IV*

A three and a half year old cow in the ninth month of gestation was vaccinated subcutaneously on April 16, with 10 cc. of vaccine IV prepared according to Example I. The titer increased from 1:25 to 1:200 within a week. On May 14, less than one month later, the titer had returned to 1:25. On that day the cow was challenged by injecting 2 cc. of a fresh suspension of Brucella ($10^9$ bacteria per cc.) intramuscularly. The cow calved on May 18, on time and without complication. The uterine discharge gave a negative test for Brucella. On May 28, the titer of this cow was 1:400. The titer dropped to 1:100 by the 15th of June.

We have discovered that the procedure described in Example I for preparing a vaccine may be slightly modified in that the nutrient medium containing the living bacteria at the end of the 48 hour growth period may be treated with one percent by weight sodium carbonate and incubated at 37° C. for 12 to 48 hours prior to separating the bacteria. In this procedure, the culture, after incubation, is centrifuged and filtered through a sterile filter to remove all living bacteria as described above. The filtrate so obtained appears to be a more active vaccine inasmuch as cows vaccinated with this material developed a high agglutination titer.

It should be emphasized that the vaccinated animals can be distinguished from the unvaccinated infected animals by subtle differences in the agglutination phenomenon. Whereas the blood serum from an infected animal is normally observed to cause a coarse coagulation or clumping of dead bacteria added thereto; a blood serum from a vaccinated (non-infected) cow gives a precipitate, the particles of which are unmistakably smaller in size. Moreover, when the agglutination test is made in the standard way by placing a small amount of serum on a glass plate, these finely divided particles migrate to the edge of the serum pool leaving the center portion clear. By contrast, the larger particles of precipitate recognized as a positive test for an infected animal do not migrate but remain dispersed throughout the serum pool.

Vaccination with from 3 cc. to 20 cc. of the product prepared according to Example I provides valuable protection by establishing uniform resistance to brucellosis. The actual amount of vaccine administered will relate to the body weight, but about 20 cc. has been effective for periods exceeding one year. If desired, the vaccine may be administered together with polyvinyl pyrrolidone or polyvinyl methyl ether or other adjuvants that produce a depot effect.

Vaccination as calves is preferred, although, it is an advantage of our vaccine that vaccination of adult cattle is both effective and safe. When pregnant animals are vaccinated, there is no danger of causing an abortion. There is no evidence that the vaccination of lactating animals will cause any drop in milk production.

While the invention has been described in great detail in the foregoing description, such detail was to be considered as illustrative only and not restrictive in character.

What is claimed is:

In a method of preparing immunizing antigens effective in the vaccination of cattle wherein a living Brucella culture is extracted with an aqueous alkaline solution and the bacteria separated from the aqueous alkaline solution, the improvement which comprises incubating the Brucella bacteria in an aqueous nutrient medium for 48 hours at 37° C., adding one percent by weight of sodium carbonate to said medium, reincubating the so-treated medium for 12 to 48 hours, and then separating the aqueous phase from the bacteria.

References Cited in the file of this patent

UNITED STATES PATENTS 2,682,492 Huddleson -------------- June 29, 1954

FOREIGN PATENTS 680,788 Great Britain ---------- Oct. 8, 1952

OTHER REFERENCES

Proc. Soc. Exp. Biol. and Med., October 1956, p. 9.

Chem. Abst., vol. 32, 1938, pp. 6376, 6377.

Chem. Abst., vol. 48, 1954, p. 4099.

Topping: J. Path. of Bact., vol. 39, 1934, pp. 655–668.

Pop et al.: Compt. Rendue de la Soc. de Biologie, 1938, pp. 733–738.

Huddleson: "Brucellosis in Man and Animals," 1943, pp. 146–151, 239–40, 245–6, 248 and 257–60.

Dubos: The Bacterial Cell, pub. 1955, Harvard Univ. Press, Cambridge, Mass., pp. 104–110, 196, 243, 248.

Kabat et al.: "Expt. Immunochem," 1948, pp. 72 and 441.

Harris: J.A.M.A., August 1946, pp. 1485–1494.